US010953820B2

(12) United States Patent
Hamdoon et al.

(10) Patent No.: US 10,953,820 B2
(45) Date of Patent: Mar. 23, 2021

(54) UPPER REINFORCEMENT FOR A DOOR TRIM PANEL AND METHOD OF TUNING PERFORMANCE CHARACTERISTICS THEREOF

(71) Applicant: FORD GLOBAL TECHNOLOGIES, LLC, Dearborn, MI (US)

(72) Inventors: Muhsin M. Hamdoon, Windsor (CA); Marwan Ahmad Elbkaily, Canton, MI (US); George David Aucott, Novi, MI (US); Amit Chakravarty, Warren, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/693,470

(22) Filed: Nov. 25, 2019

(65) Prior Publication Data

US 2020/0094753 A1     Mar. 26, 2020

Related U.S. Application Data

(63) Continuation-in-part of application No. 15/926,789, filed on Mar. 20, 2018, now Pat. No. 10,518,615.

(51) Int. Cl.
*B60R 13/02*     (2006.01)
*B60R 21/04*     (2006.01)
*B60J 5/04*     (2006.01)

(52) U.S. Cl.
CPC ...... *B60R 13/0243* (2013.01); *B60R 21/0428* (2013.01); *B60J 5/0413* (2013.01);
(Continued)

(58) Field of Classification Search
CPC ............ B60R 13/0243; B60R 21/0428; B60R 13/0206; B60R 2013/0293;
(Continued)

(56) References Cited

U.S. PATENT DOCUMENTS 3,936,090 A * 2/1976 Aya ........................ B60J 5/0411
296/146.6
5,171,058 A    12/1992 Ishikawa
(Continued)

FOREIGN PATENT DOCUMENTS

CN        101412360 A     4/2009
FR          2928871 A1     9/2009
(Continued)

OTHER PUBLICATIONS

English Machine Translation of JP2008149760A dated Jul. 3, 2008.
(Continued)

*Primary Examiner* — Pinel E Romain
(74) *Attorney, Agent, or Firm* — David Coppiellie; King & Schickli, PLLC

(57) ABSTRACT

An upper reinforcement for a door trim panel includes a reinforcement channel, and a rib extending across the reinforcement channel. More particularly, the rib includes a first end section that engages a first wall of the channel, a second end section that engages a third wall of the channel and an intermediate section that extends across a window in the second wall of the channel.

20 Claims, 8 Drawing Sheets

(52) U.S. Cl.
CPC ............ *B60J 5/0416* (2013.01); *B60J 5/0451* (2013.01); *B60R 13/0206* (2013.01); *B60R 2013/0281* (2013.01); *B60R 2013/0287* (2013.01); *B60R 2013/0293* (2013.01); *B60R 2021/0414* (2013.01)

(58) Field of Classification Search
CPC .... B60R 2013/0281; B60R 2013/0287; B60R 2021/0414; B60J 5/0413; B60J 5/0416; B60J 5/0451
USPC .................................................. 296/187.12
See application file for complete search history.

(56) References Cited

U.S. PATENT DOCUMENTS

| | | | |
|---|---|---|---|
| 5,433,478 A | | 7/1995 | Naruse |
| 5,707,098 A | | 1/1998 | Uchida et al. |
| 5,795,013 A | | 8/1998 | Keller et al. |
| 5,820,191 A | * | 10/1998 | Blakewood, Jr. ...... B60J 5/0413 296/37.13 |
| 6,039,387 A | | 3/2000 | Choi |
| 6,264,238 B1 | | 7/2001 | MacDonald et al. |
| 6,557,929 B2 | | 5/2003 | Fox et al. |
| 6,991,279 B2 | | 1/2006 | Sweers et al. |
| 7,204,545 B2 | | 4/2007 | Roux et al. |
| 7,490,851 B2 | | 2/2009 | Riester et al. |
| 7,677,640 B2 | | 3/2010 | Dix et al. |
| 7,708,313 B2 | * | 5/2010 | Haba ................... B60R 21/0428 280/751 |
| 7,793,464 B2 | * | 9/2010 | Bucker ................... E05B 79/06 49/502 |
| 7,794,009 B2 | | 9/2010 | Pinkerton et al. |
| 8,029,041 B2 | | 10/2011 | Hall et al. |
| 8,348,313 B2 | * | 1/2013 | Chicknnenahalli ..... B60R 19/18 293/120 |
| 8,418,408 B2 | * | 4/2013 | Yasuhara ............... B60J 5/0426 49/502 |
| 8,960,774 B2 | | 2/2015 | Sakhare et al. |
| 9,266,489 B2 | | 2/2016 | Smith et al. |
| 2015/0298637 A1 | | 10/2015 | Hase et al. |
| 2018/0036970 A1 | | 2/2018 | Chmielewski et al. |
| 2018/0257596 A1 | | 9/2018 | Migaki |
| 2020/0079191 A1 | * | 3/2020 | Plentis ................... B60J 5/0411 |

FOREIGN PATENT DOCUMENTS

| | | |
|---|---|---|
| FR | 2979608 A1 | 3/2013 |
| JP | 2005254872 A | 9/2005 |
| JP | 2008149760 A | 7/2008 |
| KR | 2007065027 A | 6/2007 |

OTHER PUBLICATIONS

English Machine Translation of CN101412360A dated Apr. 22, 2009.
English Machine Translation of KR2007065027A dated Jun. 22, 2007.
English Machine Translation of FR2928871A1 dated Sep. 25, 2009.
English Machine Translation of FR2979608A1 dated Mar. 8, 2013.
English Machine Translation of JP2005254872A dated Sep. 22, 2005.
Notice of Allowance dated Aug. 21, 2019 for U.S. Appl. No. 15/926,789, filed Mar. 20, 2018.

* cited by examiner

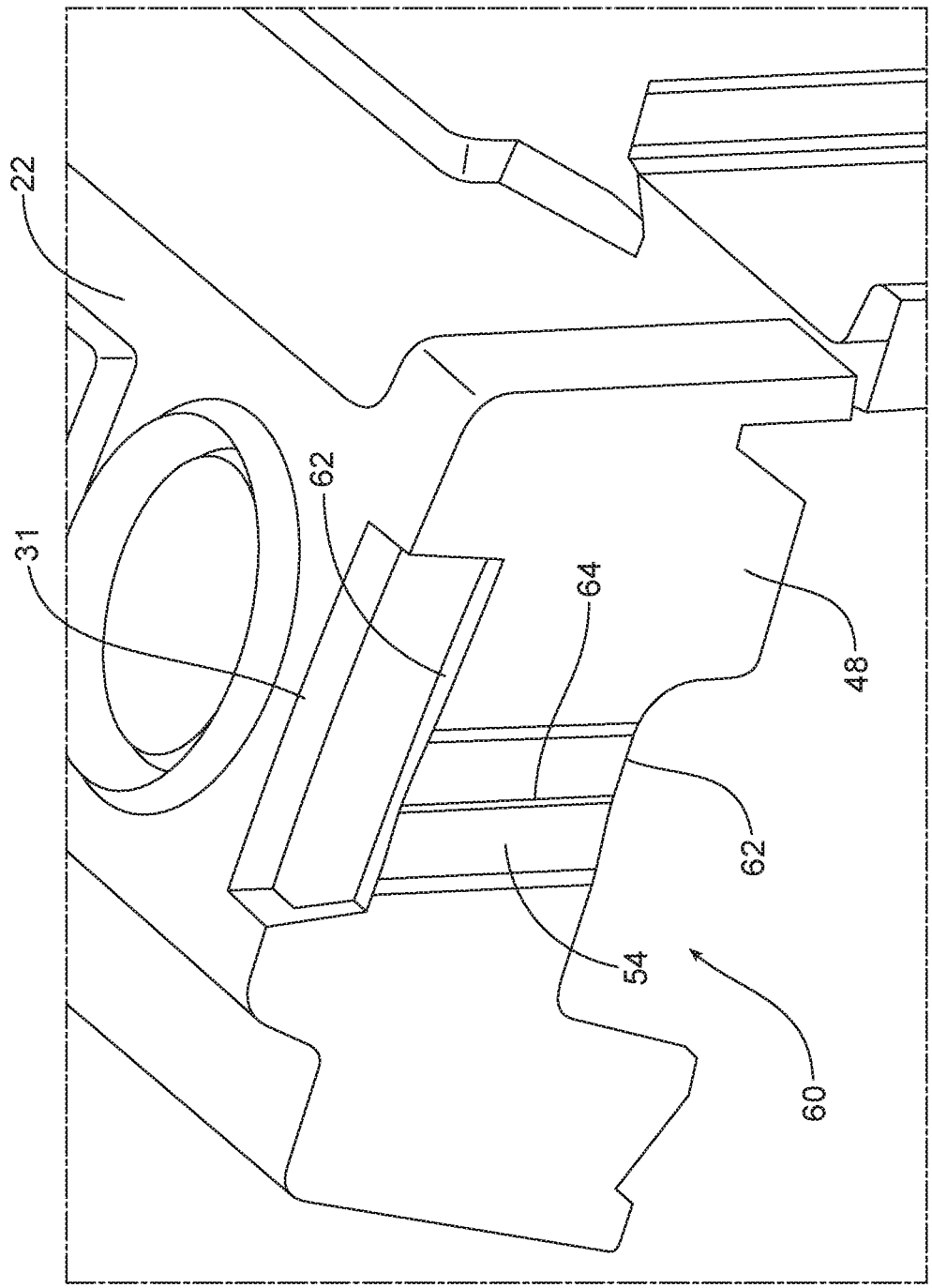

UPPER REINFORCEMENT FOR A DOOR TRIM PANEL AND METHOD OF TUNING PERFORMANCE CHARACTERISTICS THEREOF

RELATED APPLICATION

This application is a continuation-in-part of U.S. patent application Ser. No. 15/926,789 (now U.S. Pat. No. 10,518,615), filed on 20 Mar. 2018, the full disclosure of which is incorporated herein by reference.

TECHNICAL FIELD

This document relates generally to the motor vehicle equipment field and, more particularly, to a new and improved upper reinforcement for a door trim panel as well as to a method of tuning the performance characteristics of that upper reinforcement.

BACKGROUND

One of the challenges facing crash safety and interior engineers is how to provide a door trim with sufficient structural stiffness for everyday use while also providing the necessary softness to reduce load upon a motor vehicle occupant's thorax ribs in the event of a side impact. This document relates to a new and improved upper reinforcement for a door trim panel that allows the engineer to tune the performance characteristics thereof to meet these seemingly conflicting requirements.

SUMMARY

In accordance with the purposes and benefits described herein an upper reinforcement is provided for a door trim panel. That upper reinforcement comprises a reinforcement channel having a first wall, a second wall and a third wall wherein the first wall is connected to the second wall at a first corner, the second wall is connected to the third wall at a second corner and a window is provided in the second wall. The upper reinforcement also includes a rib that extends across the reinforcement channel. That rib includes a first end section engaging the first wall, a second end section engaging the second wall and an intermediate section between the first and second end sections, that extends across the window.

In one or more of the many possible embodiments of the upper reinforcement, the intermediate section has a first thickness $T_1$ that is less than a second thickness $T_2$ of said first end section and said second end section. Further, the first end section and the second end section may also engage the second wall.

In one or more of the many possible embodiments, the rib includes a trip feature tending to cause the rib to bend in response to a vehicle side impact. That trip feature may include (a) opposed notches in the intermediate section of the rib and/or (b) a weakening line extending across the rib at the intermediate section. Where the rib includes both the opposed notches and the weakening line, the weakening line may extend across the rib between the opposed notches.

In one or more of the many possible embodiments of the upper reinforcement, the upper reinforcement further includes a tab depending from said reinforcement channel and a trigger feature between said reinforcement channel and said tab whereby said reinforcement channel is released from said tab during a side impact. Still further, the upper reinforcement may further include a weakening feature (a) at said first corner, (b) at said second corner or (c) at said first corner and said second corner. That weakening feature may extend across the second wall from the first corner to the second corner. In one or more embodiments, the weakening feature may comprise a cutout.

In one or of the many possible embodiments of the upper reinforcement, the trigger feature is at least one notch. In some embodiments, the trigger feature is two V-shaped notches and a material weakening groove extending between the two V-shaped notches.

In one or more of the may possible embodiments, the upper reinforcement includes a plurality of ribs extending across a plurality of windows in the second wall and a plurality of tabs depending from the reinforcement channel. All of the plurality of ribs may have an intermediate section of a first thickness $T_1$ that is less than a second thickness $T_2$ of the first and second end sections. All of the plurality of tabs may include a trigger feature.

In the following description, there are shown and described several preferred embodiments of the upper reinforcement for a door trim panel and a related method of tuning performance characteristics of that upper reinforcement. As it should be realized, the upper reinforcement and related method are capable of other, different embodiments and their several details are capable of modification in various, obvious aspects all without departing from the upper reinforcement and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the upper reinforcement as well as the related method of tuning performance characteristics of that upper reinforcement and together with the description serve to explain certain principles thereof.

FIG. 7 is an alternative embodiment illustrating a rib that includes a trip feature comprising notches and a weakening line.

Reference will now be made in detail to the present preferred embodiments of the upper reinforcement; examples of these are illustrated in the accompanying drawing figures.

DETAILED DESCRIPTION

Figure 1:
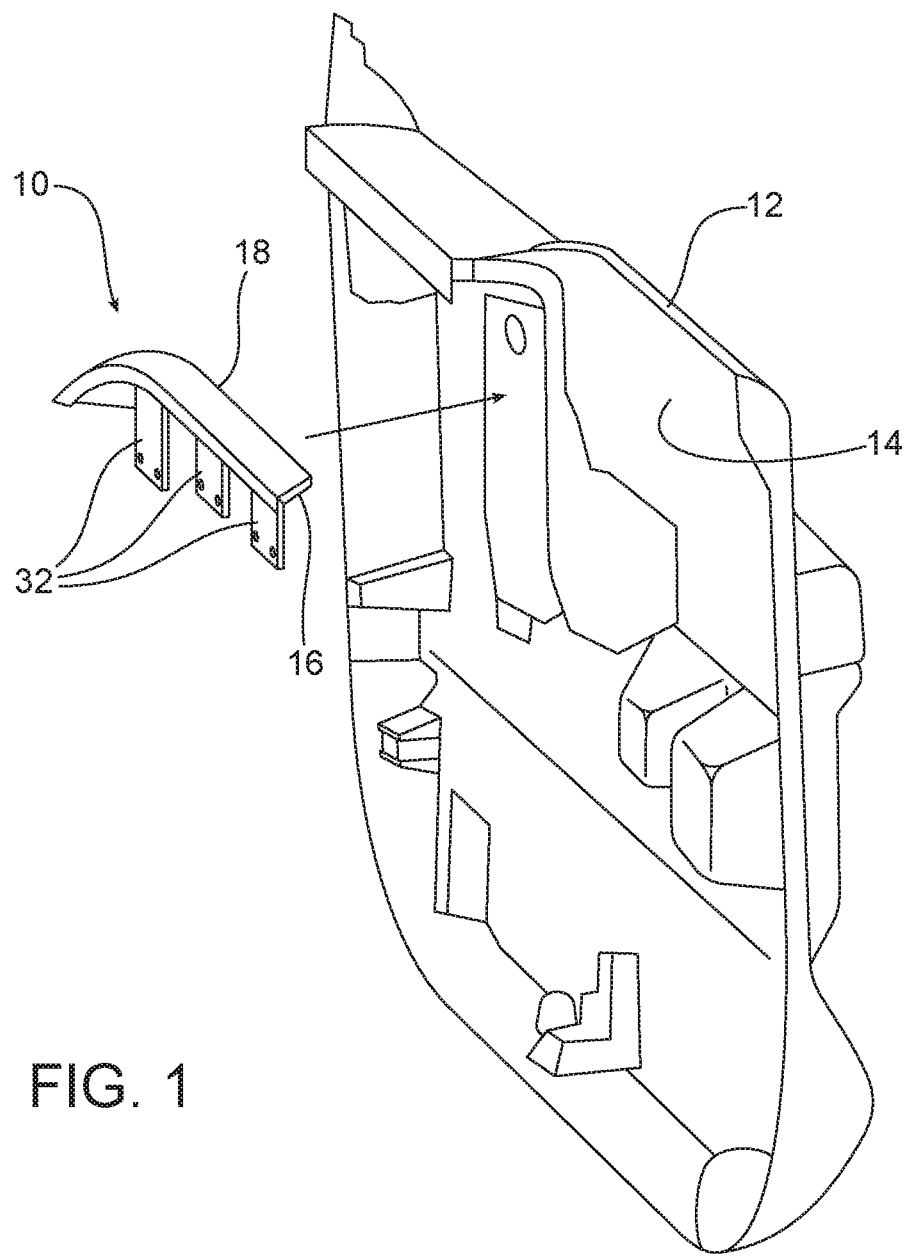
FIG. 1 is a partially exploded perspective view showing a door trim panel and an upper reinforcement that is secured to the door trim panel in order to strengthen the door trim panel.
Figure 2:
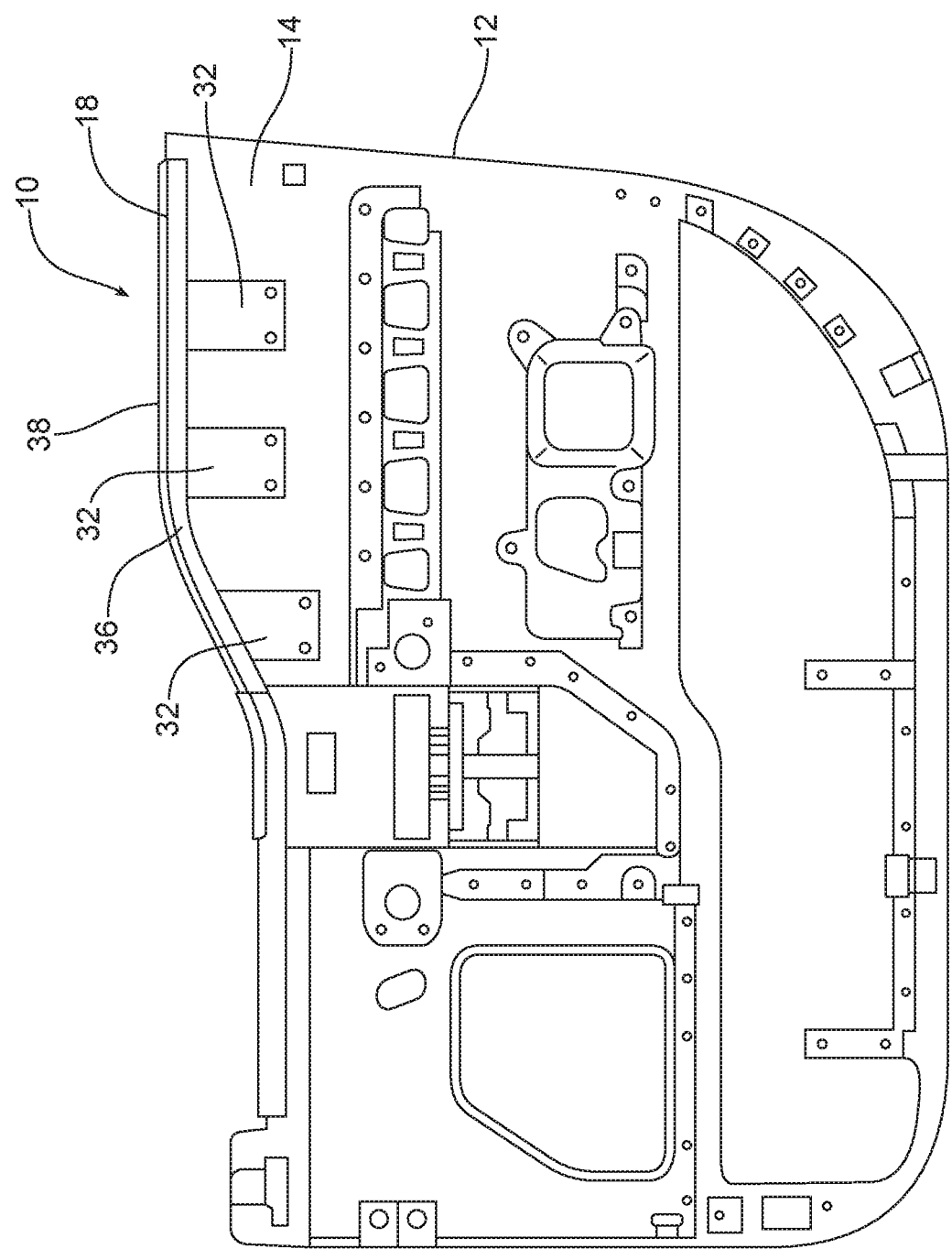
FIG. 2 is a side elevational view illustrating the upper reinforcement secured in position on the B-side of the door trim panel.

Reference is now made to FIGS. 1-5 illustrating the upper reinforcement 10 that may be utilized to increase the strength of a door trim panel 12. More particularly, as illustrated in FIGS. 1 and 2, the upper reinforcement 10 is secured to the B-face 14 along the upper edge of the door trim panel 12 to provide the necessary strength for the door trim panel 12 to function in a proper capacity over the life of the motor vehicle in which the door trim panel 12 is installed.

Figure 3:
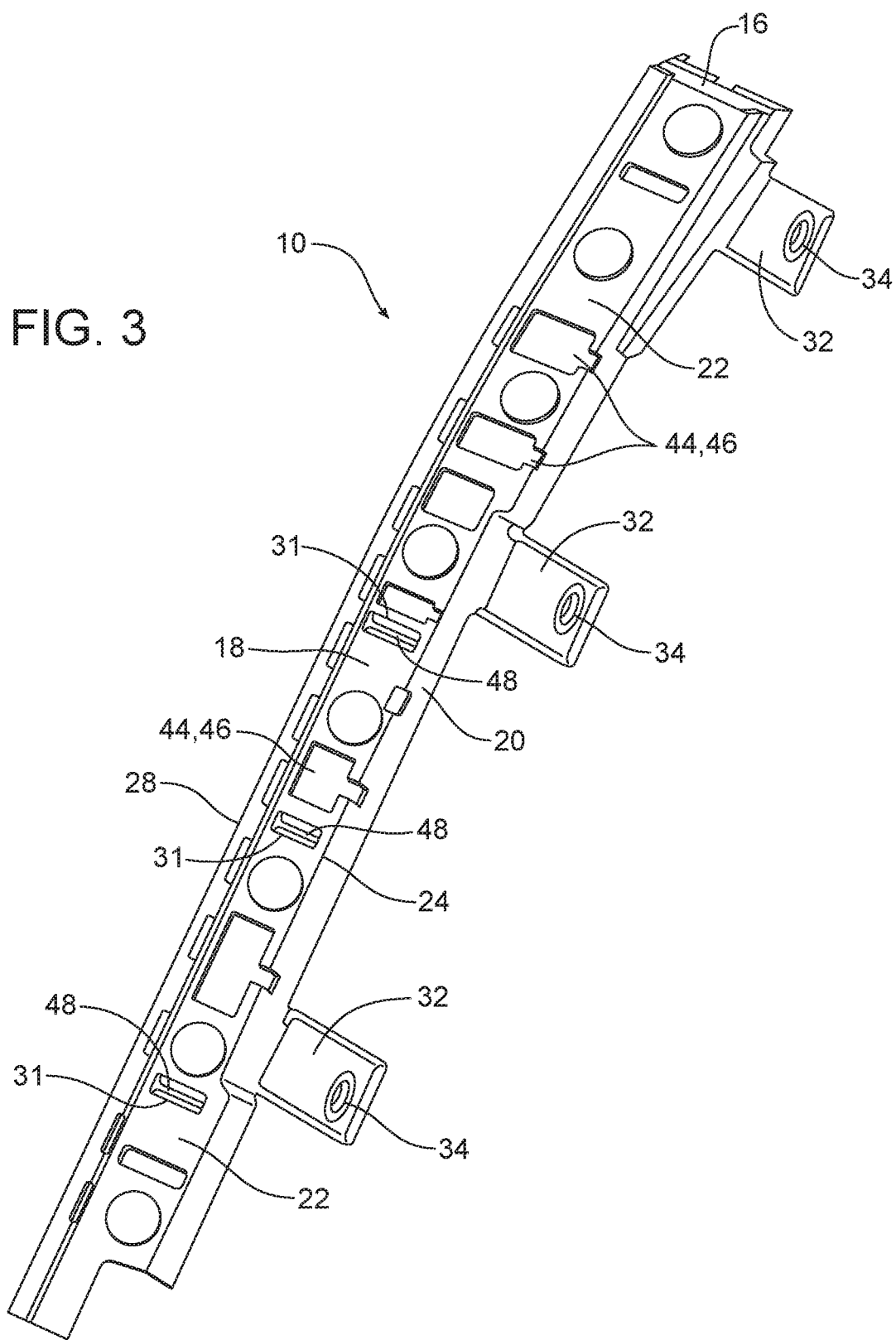
FIG. 3 is a detailed perspective view of the upper reinforcement from above illustrating the reinforcement channel, the windows in the second wall, the tabs depending from the reinforcement channel, the trigger feature between the reinforcement channel and the tabs and the weakening features provided on the reinforcement channel.
Figure 4:
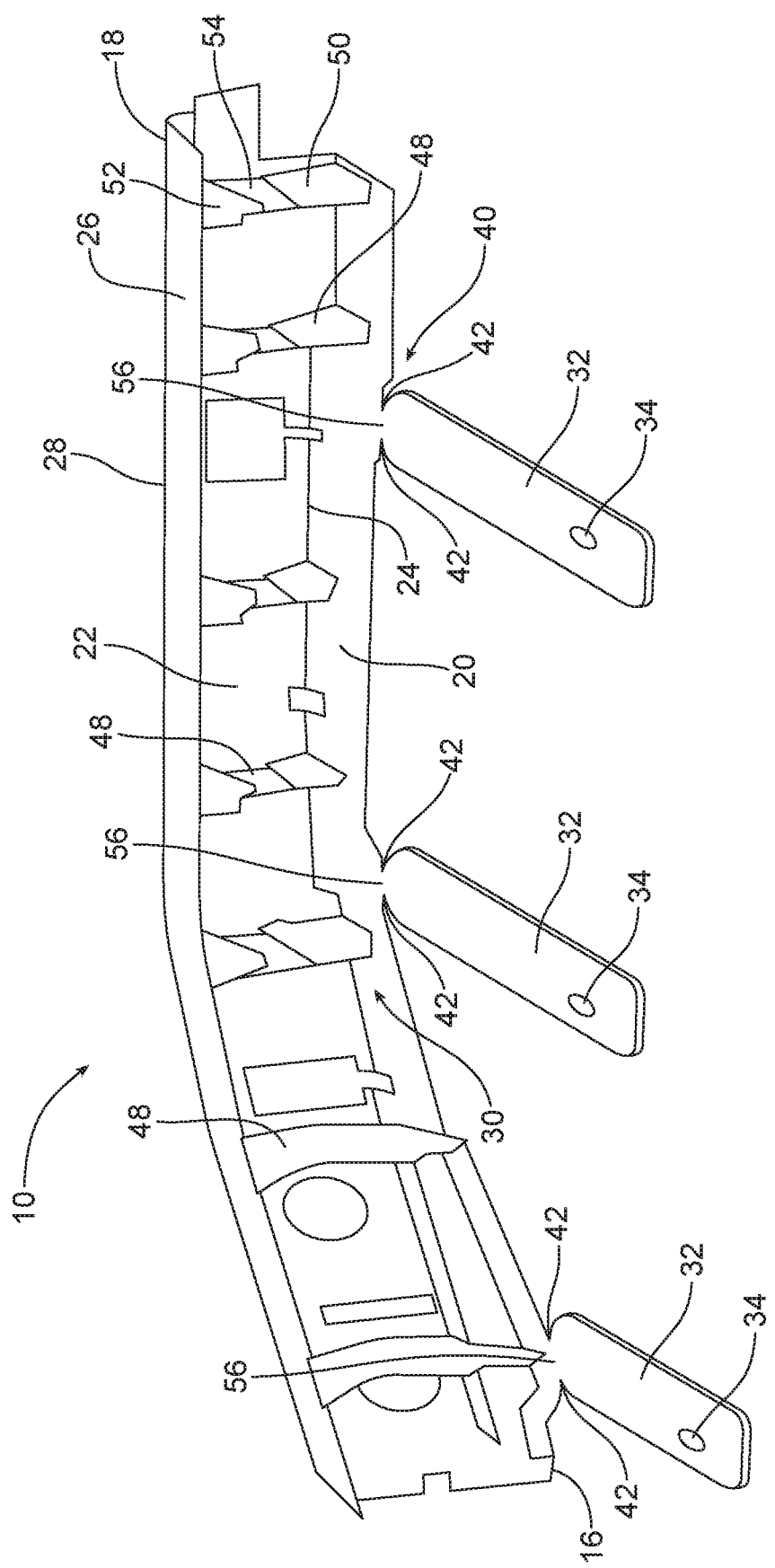
FIG. 4 is a detailed perspective view of the channel side of the reinforcement channel illustrating the ribs that extend across the open channel as well as the tabs depending from the channel and the trigger feature between the reinforcement channel and the tabs.
Figure 5:
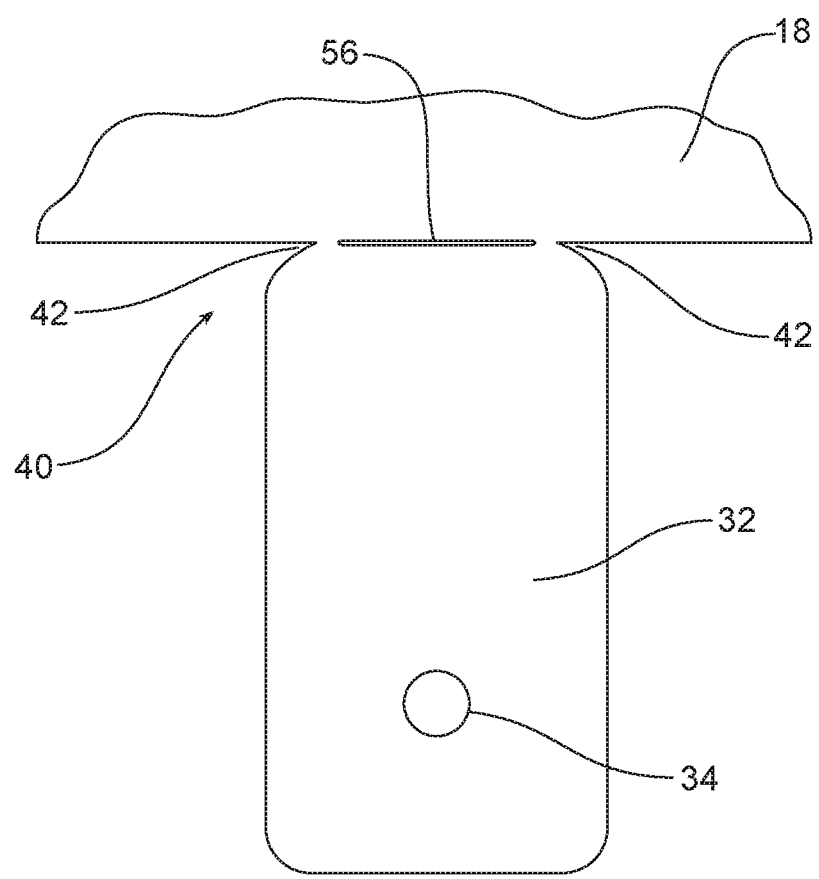
FIG. 5 is a detailed elevational view of the trigger feature provided at the intersection of each tab with the reinforcement channel of the upper reinforcement.

As best illustrated best in FIGS. 3-5, the upper reinforcement 10 comprises a unitary body 16 of polymer or other appropriate material. The unitary body 16 includes an elongated reinforcement channel 18. The reinforcement channel 18 includes a first wall 20 connected to a second wall 22 at a first corner 24 and a third wall 26 connected to the second wall at a second corner 28. As illustrated in FIG. 4, the first wall 20, the second wall 22 and the third wall 26 define an open channel generally designated by reference numeral 30. The reinforcement channel 18 may be connected by heat stake welds to the door trim panel 12. A plurality of windows 31 are provided at spaced locations in the second wall 22 of the reinforcement channel 18. A margin 33 of the second wall 22 extends between the ends 35 of each window 31 and the first and second corners 24,28.

A plurality of tabs 32 depend from the first wall 20 of the reinforcement channel 18. Each tab 32 includes a heat stake 34 for connecting the tab to the B-face 14 of the door trim panel 12. When properly seated and secured in position on the door trim panel 12, the reinforcement channel 18 nests in a curve 36 provided along the top edge 38 of the door trim panel 12 as illustrated in FIG. 2. As most clearly shown in FIG. 5, a trigger feature, generally designated by reference numeral 40, is provided between the reinforcement channel 18 and each tab 32. More particularly, in the illustrated embodiment, the trigger feature 40 comprises a pair of opposed V-shaped notches 42. In some embodiments, a single notch may be provided. In other embodiments, the notches 42 may assume a different shape.

A weakening feature, generally designated by reference numeral 44 may be provided along the reinforcement channel 18. More specifically, the weakening feature 44 in the illustrated embodiment takes the form of a cutout 46. In the illustrated embodiment, the weakening feature 44 or cutout 46 is provided at portions of the first corner 24 and at portions of the second corner 28. Further, the weakening feature 44 or cutout 46 extends across the second wall 22 from the first corner 24 to the second corner 28. In other embodiments, the weakening feature 44 or cutout 46 may be provided just at the first corner 24, just at the second corner 28 or just at both corners. The size, shape and location of the weakening feature 44 provides one means for tuning the performance characteristics of the upper reinforcement 10 in a manner described in greater detail below.

Figure 6A:
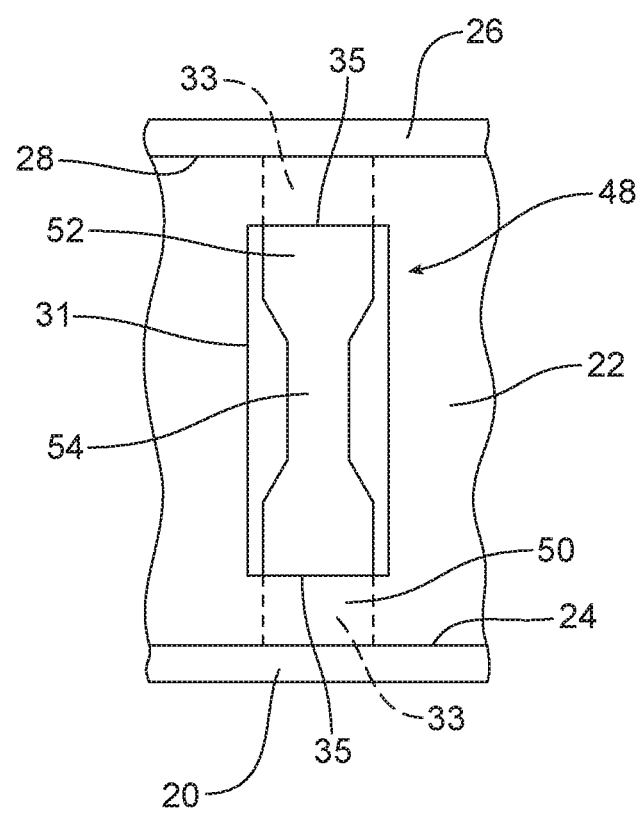
FIG. 6A is a detailed plan view of a single rib showing the intermediate section of reduced thickness, to promote bending in the event of a side impact, extending across the window in the second wall of the reinforcement channel.
Figure 6B:
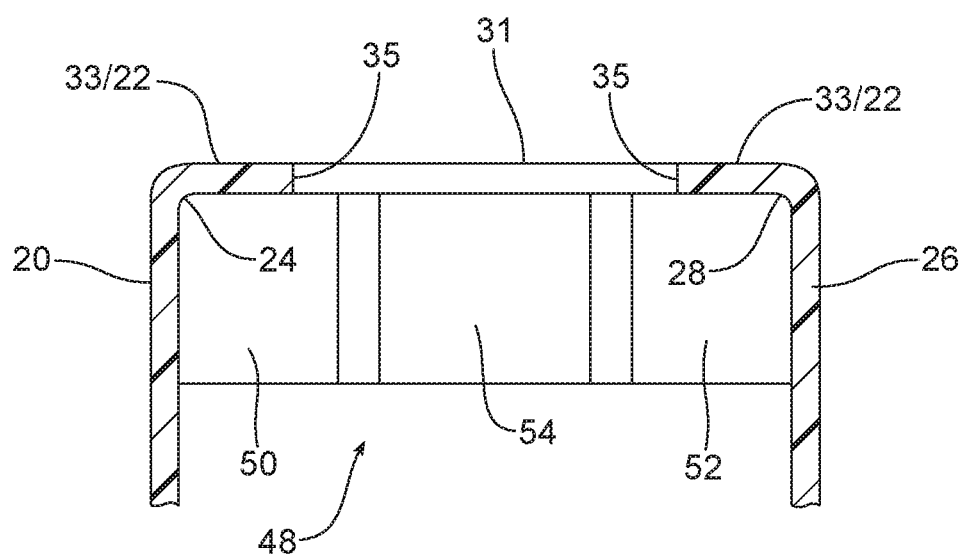
FIG. 6B is a detailed side elevational view further illustrating the structure shown in FIG. 6A.

As best illustrated in FIGS. 4, 6A and 6B, a plurality of ribs 48 may extend across the open channel 30 between the first wall 20 and the third wall 26. Each rib 48 may include a first end section 50 engaging the first wall 20, a second end section 52 engaging the third wall 26 and an intermediate section 54 between the first end section and the second end section. In the illustrated embodiment, the intermediate section has a first thickness $T_1$ that is less than a second thickness $T_2$ of the first end section 50 and the second end section 52.

As should be appreciated, the intermediate section 54 of each rib 48 extends across an associated window 31 in the second wall. The window 31 at the intermediate section 54 of each rib 48 tends to promote bending of the rib at the intermediate section. In the illustrated embodiment, the first end section 50 and the second end section 52 also engage the second wall 22 at the margins 33 extending between the window 31 and the first and second corners 24, 28. This connection of each rib 48 to the top wall 22 allows the rib to support vertical loads, either in vertical pull or push force. As a result, the upper reinforcement 10 is strong in downforce, strong in upward pull or "peel off" force and tuned to be soft in side crush force: a very desirable but difficult to achieve combination of traits.

In yet another embodiment illustrated in FIG. 7, the rib 48 associated with the window 31 includes a trip feature generally designated by reference numeral 60. In the illustrated embodiment, the trip feature 60 comprises (a) opposed notches 62 along the intermediate section 54 of the rib 48 at the window 31 that reduces the height of the rib and (b) a weakening line 64 that extends across the rib 48 between the notches 62. The weakening line 64 may be provided at a point where the thickness of the rib is at a minimum.

The performance characteristics of the rib 48 may be tuned as desired to meet strength and safety benchmarks. More particularly, the size and shape of the notches 62 may be adjusted, the thickness of the rib 48 at the ends 50, 52, intermediate section 54 may be adjusted as may the length, width and thickness of the weakening line 64.

Advantageously, the performance characteristics of the upper reinforcement 10 may be further turned as desired to meet strength and safety benchmarks. The method of tuning the performance characteristics of the upper reinforcement 10 includes the step of providing the trigger feature 40 between the reinforcement channel 18 and the tabs 32. More particularly, in the illustrated embodiment, the trigger feature 40 comprises two opposed V-shaped notches 42 and a material-weakening groove 56 extending across the relatively narrow strip of material there between. As a result, this relatively narrow strip of material is weaker than the adjacent reinforcement channel 18 and tab 32 thereby providing a break point that allows the reinforcement channel to tear away and be released from the tab 32 in the event of a side impact exceeding a predetermined design force. As should be appreciated, the width, length and thickness of the V-shaped notches 42 and the material-weakening groove 56 as well as the type of material defining the narrow strip enable the engineer to tune the performance characteristics of the upper reinforcement 10 so that it will tear and release in response to a side impact force that exceeds a predetermined design force.

The method also includes the step of providing the weakening feature 44 across any of the first wall 20, second wall 22 and third wall 26 in any of the first corner 24 and/or the second corner 28 of the reinforcement channel 18. In the illustrated embodiment, the greater the size and extent of the weakening feature 44/cutout 46, the greater the weakening effect and, therefore, the softening of the upper reinforcement 10 in the event of a side impact. However, very soft upper reinforcement may collapse easily, does not absorb enough energy, and bottoms out causing occupant to collide directly with metal parts of vehicle which may cause higher rib deflection. Therefore, this optimal design includes well studied softening features to ensure best performance. In some embodiments the weakening feature 44 or cutout 46 may extend across the second wall 22 between the two corners 24, 28.

As illustrated, the method includes using a cutout 46 as a weakening feature 44 and at least one V-shaped notch 42 as the trigger feature 40. Here it should be appreciated that the weakening feature 44 and the trigger feature 40 may assume other appropriate structures or configurations suited for the intended purpose of tuning the performance characteristics of the upper reinforcement 10.

In addition, the method may include the step of controlling the thickness of the first wall 20, the second wall 22 and the third wall 26 of the reinforcement channel 18 as well as the number and size (thickness, width and length) of the depending tabs 32 to control the strength of the upper reinforcement 10. Further, the method includes providing the reinforcement channel 18 with at least one rib 48 extending across the open channel 30 of the reinforcement channel 18. Further, the method includes providing the at least one rib 48 with a section (in the illustrated embodiment, the intermediate section 54) of reduced thickness to promote bending of the rib in the event of a side impact and therefore softening of the upper reinforcement 10. Thus, it should be appreciated that the number of ribs 48, the spacing of the ribs and the thickness of the ribs may all be controlled in order to further tune the performance characteristics of the upper reinforcement 10.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An upper reinforcement for a door trim panel, comprising:
   a reinforcement channel having a first wall, a second wall and a third wall wherein the first wall is connected to the second wall at a first corner, said second wall is connected to said third wall at a second corner and a window is provided in said second wall;
   a rib extends across said reinforcement channel, said rib including a first end section engaging said first wall, a second end section engaging said third wall and an intermediate section between said first end section and said second end section extending across said window.

2. The upper reinforcement of claim 1, wherein said intermediate section has a first thickness $T_1$ that is less than a second thickness $T_2$ of said first end section and said second end section.

3. The upper reinforcement of claim 2, wherein said first end section and said second end section also engage said second wall.

4. The upper reinforcement of claim 1, wherein said rib includes a trip feature tending to cause said rib to bend in response to a side impact.

5. The upper reinforcement of claim 4, wherein said trip feature includes opposed notches in said intermediate section of said rib.

6. The upper reinforcement of claim 5, wherein said trip feature further includes a weakening line extending across said rib between said opposed notches.

7. The upper reinforcement of claim 4, wherein said trip feature includes a weakening line extending across said rib at the intermediate section.

8. The upper reinforcement of claim 3, further including a tab depending from said reinforcement channel and a trigger feature between said reinforcement channel and said tab whereby said reinforcement channel is released from said tab during a side impact.

9. The upper reinforcement of claim 8, further including a weakening feature (a) at said first corner, (b) at said second corner or (c) at said first corner and said second corner.

10. The upper reinforcement of claim 9, wherein said weakening feature extends across said second wall from said first corner to said second corner.

11. The upper reinforcement of claim 10, wherein said weakening feature is a cutout.

12. The upper reinforcement of claim 11, wherein said trigger feature is at least one notch.

13. The upper reinforcement of claim 11, wherein said trigger feature is two V-shaped notches and a material weakening groove extending between said two V-shaped notches.

14. The upper reinforcement of claim 11, wherein said upper reinforcement includes a plurality of ribs extending across a plurality of windows in the second wall and a plurality of tabs depending from said reinforcement channel.

15. The upper reinforcement of claim 14, wherein all said plurality of ribs have intermediate sections having the first thickness $T_1$ less than the second thickness $T_2$ of the first end section and the second end section and all of said plurality of tabs include said trigger feature.

16. The upper reinforcement of claim 8, wherein said trigger feature is at least one notch.

17. The upper reinforcement of claim 8, wherein said trigger feature is two V-shaped notches and a material weakening groove extending between said two V-shaped notches.

18. The upper reinforcement of claim 8, wherein said upper reinforcement includes a plurality of ribs extending across a plurality of windows in the second wall and a plurality of tabs depending from said reinforcement channel.

19. The upper reinforcement of claim 1, further including a weakening feature (a) at said first corner, (b) at said second corner or (c) at said first corner and said second corner.

20. The upper reinforcement of claim 19, wherein said weakening feature extends across said second wall from said first corner to said second corner.

* * * * *